United States Patent [19]

Takada

[11] 4,380,751
[45] Apr. 19, 1983

[54] WARNING SYSTEM FOR PASSIVE VEHICLE OCCUPANT RESTRAINT BELTS

[76] Inventor: Juichiro Takada, 3-12-1, Shinmachi, Setagayaku, Takyoto, Japan

[21] Appl. No.: 210,152

[22] Filed: Nov. 25, 1980

[30] Foreign Application Priority Data

Nov. 30, 1979 [JP] Japan .................. 54-164948[U]

[51] Int. Cl.³ .................. B60R 21/02; B60R 21/10
[52] U.S. Cl. .................. 340/52 E; 200/61.58 B; 280/804; 307/10 S; 340/687
[58] Field of Search .................. 340/52 E, 687; 280/804; 307/10 SB; 200/61.58 B

[56] References Cited

U.S. PATENT DOCUMENTS 4,268,816 5/1981 Matsuoka et al. .................. 340/52 E
4,321,979 3/1982 Kuroyama et al. .................. 280/804 X Primary Examiner—John W. Caldwell, Sr.
Assistant Examiner—Joseph E. Nowicki
Attorney, Agent, or Firm—Brumbaugh, Graves, Donohue & Raymond

[57] ABSTRACT

A moving anchor type passive vehicle occupant restraint belt system having a restraint belt which is transferable along a guide rail affixed in the vehicle roof above the door between an occupant-releasing configuration and an occupant-restraining configuration. The locking device comprises a locking pawl mounted in a fixed anchor member which engages cams provided on the top edge of a movable anchor member and selectively locks the movable anchor member with the fixed anchor member in the occupant-restraining configuration. The invention further comprises an electrical warning system for indicating when the movable anchor member is in the occupant-releasing position, when the pawl is engaged in the cams in the occupant-restraining position, and if the tongue plate attached to the safety belt is properly engaged in the buckle affixed to the moving anchor member.

7 Claims, 9 Drawing Figures

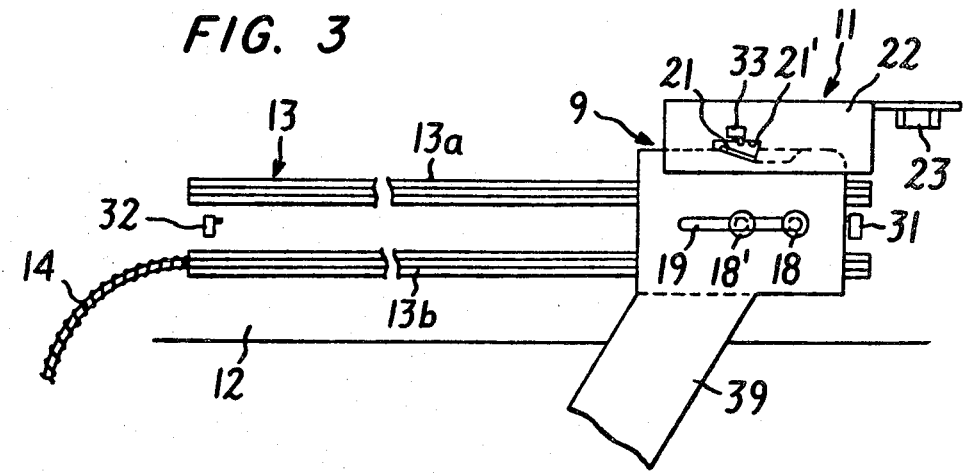
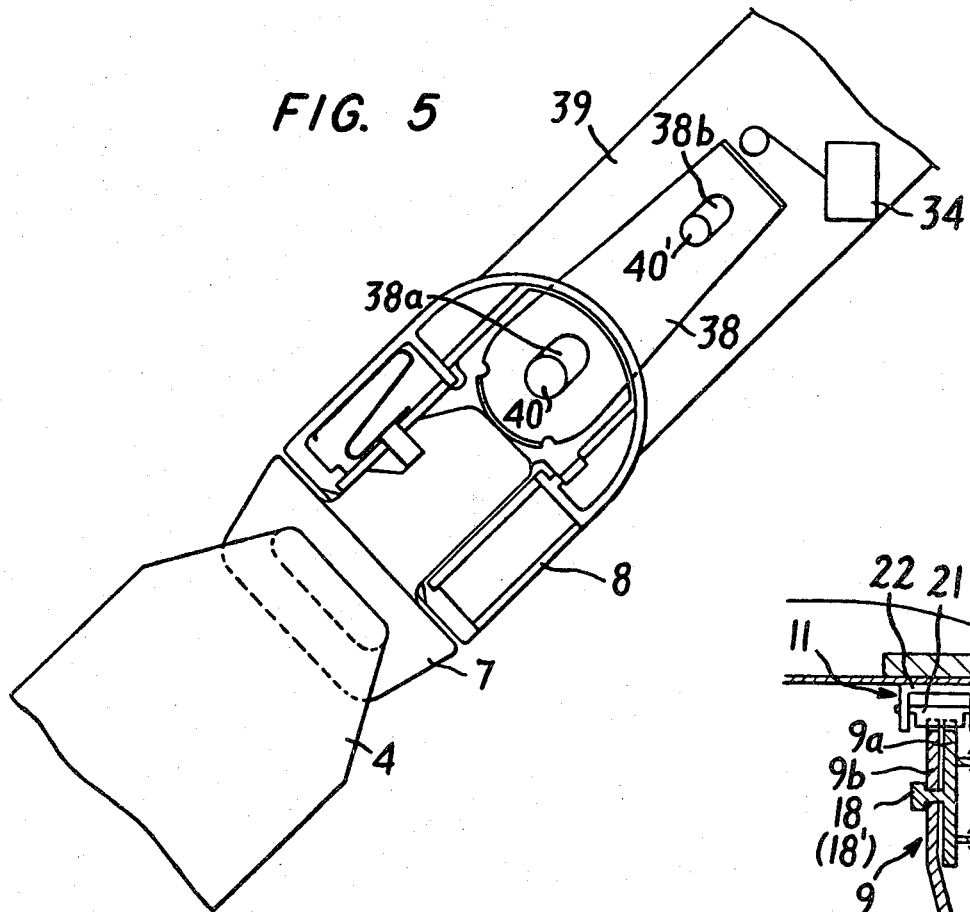
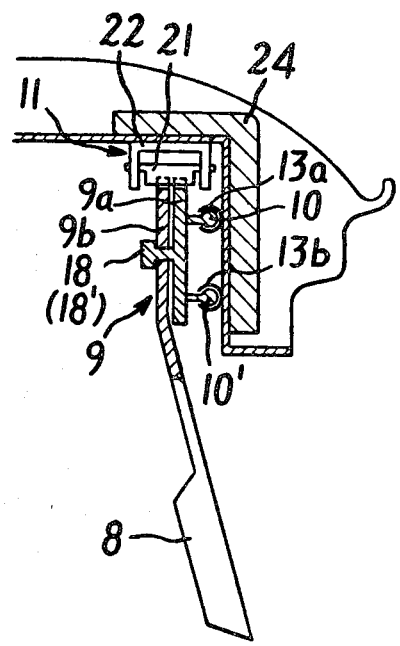

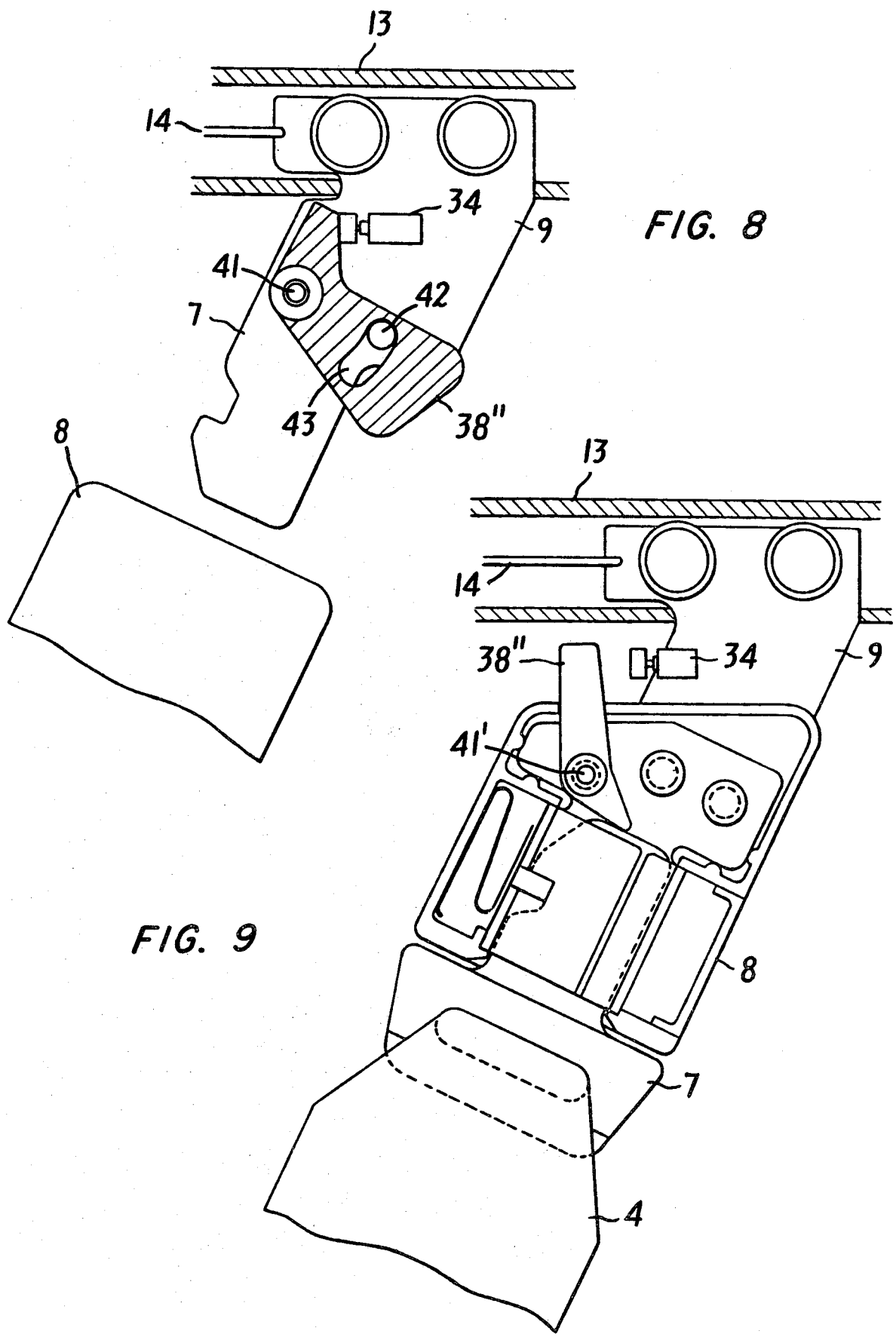

WARNING SYSTEM FOR PASSIVE VEHICLE OCCUPANT RESTRAINT BELTS

FIELD OF THE INVENTION

The present invention relates to a passive vehicle occupant seat belt assembly of the type in which the outboard end of a shoulder belt is connected by an emergency release buckle to a moveable anchor that is transferred along a guide rail above the door between a restraint location and a release location. In particular, the invention concerns warning systems for strongly encouraging the occupant to keep the belt fastened and for indicating possible malfunction of the system.

BACKGROUND OF THE INVENTION

It is widely recognized that the manually-operated seat belt systems with which most vehicles presently in use are equipped are often not used. Many people tend not to use manually-operated safety belts because they either find it inconvenient or troublesome to fasten them when they get into the vehicle and unfasten them when they get out or they find them uncomfortable or somewhat restrictive of movement. Because of the reluctance of people to use manually fastened seat belt systems, government and industry are moving in the direction of requiring and furnishing, respectively, passive safety belt systems, i.e., belt systems which automatically move to an occupant-restraining position when the occupant enters the vehicle and automatically move to an occupant-releasing position when the occupant leaves the vehicle. Advantageously, such passive safety belt systems should require a minimum amount of space, contribute a minimum amount of weight, complexity and cost to the vehicle, should operate reliably with absolutely no margin of error and should provide for prompt and simple release in an emergency. Fulfilling all of these requirements is difficult.

The desirability of providing for emergency release of the restraint belt system has, of course, a somewhat detrimental effect; the provision of an emergency release buckle can defeat the basic purpose of a pasive system, namely, the complete assurance that the occupant will use the restraint belt, inasmuch as the occupant can unfasten the belt using the emergency release buckle. An object of the present invention is to counteract the effect of the emergency release buckle as a means by which the occupant can avoid the use of the restraint belt. A further object of the invention is to improve the reliability of the system by warning the occupant of a possible malfunction so that steps can be taken to correct the malfunction rather than to present a risk of the failure of the system to restrain the occupant in the event of a collision in the circumstance of an otherwise unknown malfunction. The invention also provides a system that is particularly suitable for the so-called hard-top type of vehicle, i.e., a vehicle that does not have a center pillar.

SUMMARY OF THE INVENTION

More particularly, the invention provides a safety belt system which is of relatively simple and durable construction, provides maximum assurance of reliable operation and strongly encourages the occupant not to disable the system by disconnecting the emergency release buckle. The seat belt system, according to the invention, comprises a shoulder belt extending upwardly and outwardly across the vehicle seat from adjacent the inboard lower rear portion of the seat, a guide rail affixed to the edge of the vehicle roof generally above the door and a movable anchor received by the guide rail for movement between a restraint location adjacent the rear end of the guide rail and a release location adjacent the front end of the guide rail. A drive device moves the movable anchor between the release and restraint locations in response to closing and opening of the vehicle door. The outboard end of the shoulder belt is connected by an emergency release buckle to the movable anchor, and a fixed anchor adjacent the restraint location of the movable anchor and having a locking pawl is adapted to lock the movable anchor at the restraint location. A switch or an equivalent means is provided for detecting the presence of the movable anchor at the restraint location and for producing a warning signal when the movable anchor is not at the restraint location. There is also a switch or the like for detecting when the pawl is disengaged from the movable anchor and for producing a warning signal thereof only when the movable anchor is at the restraining location. A third switch detects when the buckle is not fastened and produces a warning signal indicative thereof only when the movable anchor is at the restraining location.

An important aspect of the invention is the fact that the warning systems for indicating that the movble anchor is not latched to the fixed anchor and that the buckle is disconnected operate only when the movable anchor is at the restraint location. Accordingly, the occupant is not confronted with possibly irritating and useless warnings but is warned only when a warning is meaningful; i.e., when the anchor should be locked and the buckle fastened. Moreover, the occupant is much more likely to pay attention to a warning that is rarely, if ever, given, as compared to a warning that is given every time the door is opened or closed, which would be the case if the anchor lock warning operated whenever the movable anchor unlocked.

In a preferred embodiment, a very simple electrical circuit provides the above-described advantage. The buckle detector switch and the anchor lock detector switch are connected in parallel with each other and in series with a switch that is closed to complete circuits across the buckle and lock detector switches only when the movable anchor is at the restraint location.

For a better understanding of the invention and a description of other features and arrangements, reference may be made to the following description of exemplary embodiments taken in conjunction with the figures of the accompanying drawings.

DESCRIPTION OF THE DRAWINGS

FIG. 3 is a side elevational view of the movable anchor system shown in FIG. 1 in the locking position;

FIG. 4 is an end cross-sectional view of the movable anchor system in the locked configuration taken generally along the lines 4—4 of FIG. 2;

FIG. 5 is an elevational view of one form of buckle and warning switch toggle in which the buckle cover is removed;

FIG. 8 is an elevational view of the toggle and buckle arrangement of FIG. 7 in the disengaged position; and FIG. 9 is an elevational view of another embodiment of a buckle and warning switch toggle.

DETAILED DESCRIPTION OF THE DRAWINGS

Figure 1:
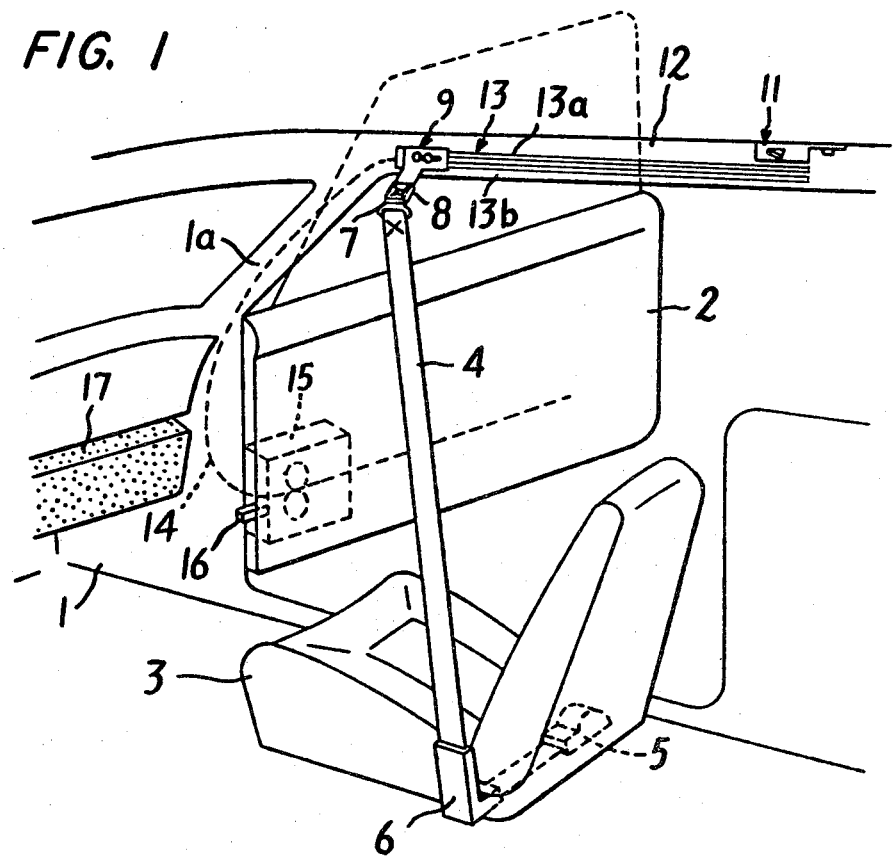
FIG. 1 is a pictorial view in schematic form of a typical restraint belt system which uses a shoulder belt and an energy absorbing knee bolster; one embodiment of the movable anchor system is depicted.

The restraint belt system shown in FIGS. 1 to 4 includes a shoulder belt 4 which leads from an emergency locking retractor 5 mounted under the seat 3 through a belt force-actuated belt clamp and a guide 6 on the inboard side of the seat and then upwardly and outwardly across the seat 3 to a buckle tongue 7 which is releasably attached to an emergency release buckle 8. In addition to the shoulder belt 4, which restrains the upper body of the vehicle occupant when it is in the restraint configuration, the restraint system also includes an energy-absorbing knee bolster 17 which affords protection to the lower part of the occupants's body.

The outboard end of the shoulder belt 4 is attached by the buckle and tongue to the movable anchor 9 of a moving anchor system. The anchor 9 moves along a guide rail 13 mounted at the edge of the roof 12 of the vehicle body 1 generally above the door 2 and is connected by a transfer drive element 14, such as a racked wire, which leads forwardly from the anchor member 9 through one of two guideways 13a and 13b of the guide rail 13 and then downwardly within the front post 1a of the vehicle body 1 and finally turns back and leads into the vehicle door 2 where it meshes with the output gear of a mechanical motion amplifier 15. When the door is moved from the closed position toward the open position, preferably during only part of the opening motion up to about half way open, the motion amplifier 15 is driven by a link 16 connected to the door frame and pulls the wire 14 into the door 2, thereby pulling the movable anchor member 9 forwardly along the guide rail 13 to a release position in which the belt 4 is in an occupant-releasing configuration, as shown in FIG. 1. When the door 2 is closed, the mechanical motion amplifier 15 drives the wire 14 out from the door 2, and pushes the movable anchor 9 rearwardly along the guide rail 9 into a restraint position near the upper rear corner of the door 2 and above and behind the vehicle occupant.

Figure 2:
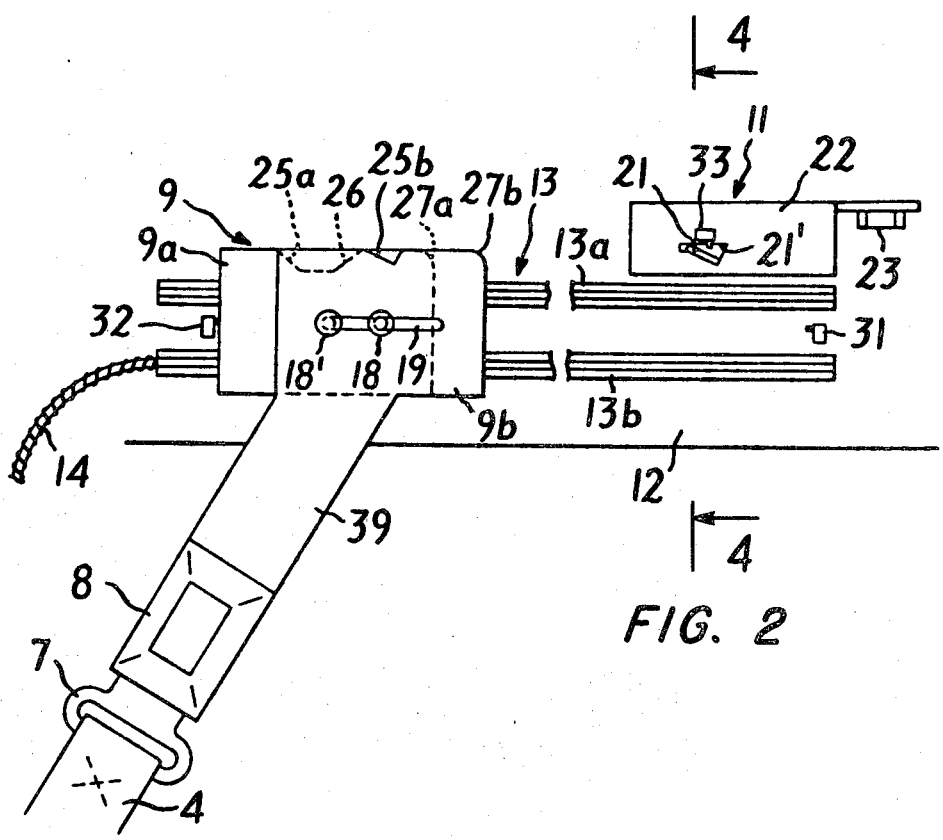
FIG. 2 is a schematic, side elevational view of the movable anchor system shown in FIG. 1 in the nonlocking position.

As shown in FIGS. 2 to 4, the movable anchor 9 consists of two parts, 9a and 9b. Part 9a is a slider that has a pair of lugs 10 and 10' that are slidably received in corresponding guideways 13a and 13b in the guide rail. The two parts 9a and 9b are joined for lengthwise relative motion by a pair of pins 18 and 18' on the part 9a which are received in an elongated slot 19 in the part 9b. The racket wire 14 is connected to the part 9a, and when the wire 14 pulls the part 9a from right to left (relative to FIGS. 2 and 3 of the drawings) the part 9a tends to shift to the left relative to the part 9b, as shown in FIG. 2, depending upon the direction of force applied by the belt, but when the wird 14 pushes the part 9a from left to right, the part 9a moves to the right relative to the part 9b (again depending upon the direction of force applied by the belt). The emergency release buckle 8 by which the shoulder belt is connected by means of the buckle tongue 7 to the movable anchor is affixed to the lower end of an arm 39 that is an integral part of or fastened to the part 9b of the movable anchor 9.

A fixed anchor 11 is located at the restraint location of the movable anchor, i.e., adjacent the rear end of the guide rail. The fixed anchor includes a channel-shaped bracket 22 that is strongly secured to the vehicle body by a bolt 23 and a reinforcing angle 24. A locking pawl 21 bridges the space between the flanges of the bracket 22 and pivots within aligned pie-shaped holes 21' in the respective flanges between an upper, release portion (not shown) in which it engages a warning switch 33 (described in more detail below) and a lower position in which it is adapted to lock the movable anchor 9 in the restraint location by engaging a locking notch 25b in the upper edge of the movable anchor part 9b (see FIG. 3).

When the movable anchor 9 is in the restraint location and locked to the fixed anchor 11 (FIG. 3), the part 9a lies in its rightward most position, relative to the part 9b. In that position the locking notch 25b of the part 9b is in register with a cam notch 26 in the part 9a, thereby allowing the pawl 21 to fall down into the locking position in the locking notch 25b. Accordingly, the pawl retains the movable anchor 9 strongly and securely in the restraint location.

When the vehicle door 2 is moved from closed toward open, the link 16 drives the motion amplifier 15 in a direction to pull the wire 14 to the left (relative to FIGS. 2 and 3). The wire 14 pulls the part 9a to the left, relative to the part 9b and to the fixed anchor 11. The release cam surface 26 of the cam notch 25a engages the pawl 21 and pushes it up out of the locked, down position in the locking notch 25b in the part 9b of the moveable anchor 9. Thereupon, the complete movable anchor assembly is released from the locked position at the restraint location, and as the wire 14 is driven by the motion amplifier upon further opening of the door, the movable anchor is moved to the release location and configuration shown in FIG. 1 of the drawings. When the door is closed, the above-described process reverses; i.e., the wire 14 pushes the part 9a of the moveable anchor to the right, whereupon the lost motion between the parts 9a and 9b restores them to positions in which the locking notch 25b and the camming notch 25a register (see FIG. 3), and upon full closing of the door, the moveable anchor 9 is again locked in the restraint location by the reception of the pawl of the fixed anchor 11 in the locking notch.

Before proceeding with a description of the warning system, in accordance with the present invention, it is useful to observe the locations of the warning system switches. A restraint location indicating switch 31 (FIGS. 2 and 3) is located adjacent the fixed anchor 11 for engagement and transfer by the movable anchor 9 when it is at the restraint location. A release location indicating switch 32 is located adjacent the forward end of the guide rail 13 for engagement and transfer by the movable anchor 9 when it is at the forward, release location. The switch 32 is not required in cases in which a mechanical motion amplifier is used to drive the movable anchor between the release and restraint locations, but inasmuch as an electric motor drive can readily be substituted for a mechanical motion amplifier, the switch 32 is illustrated and described in connection with an electrical motor driven system. The pawl locking detector switch 33 is mentioned above in connection with the description of the fixed anchor 11. A buckle detector switch 34 is installed on the arm 39 of the movable anchor in a position for engagement and transfer by a toggle 38 carried by the arm 39 by means of pins 40 and 40' that are received in corresponding elongated holes 38a and 38b in the toggle 38. As shown in FIG. 5, when the tongue 7 is latched in position in the buckle 8, the end of the tongue pushes the toggle 38 upwardly for engagement with and transfer of the detector switch 34. When the buckle is detached and the tongue 7 released, the toggle 38 slides down by gravity, thereby releasing and transferring the switch 34.

Figure 6:
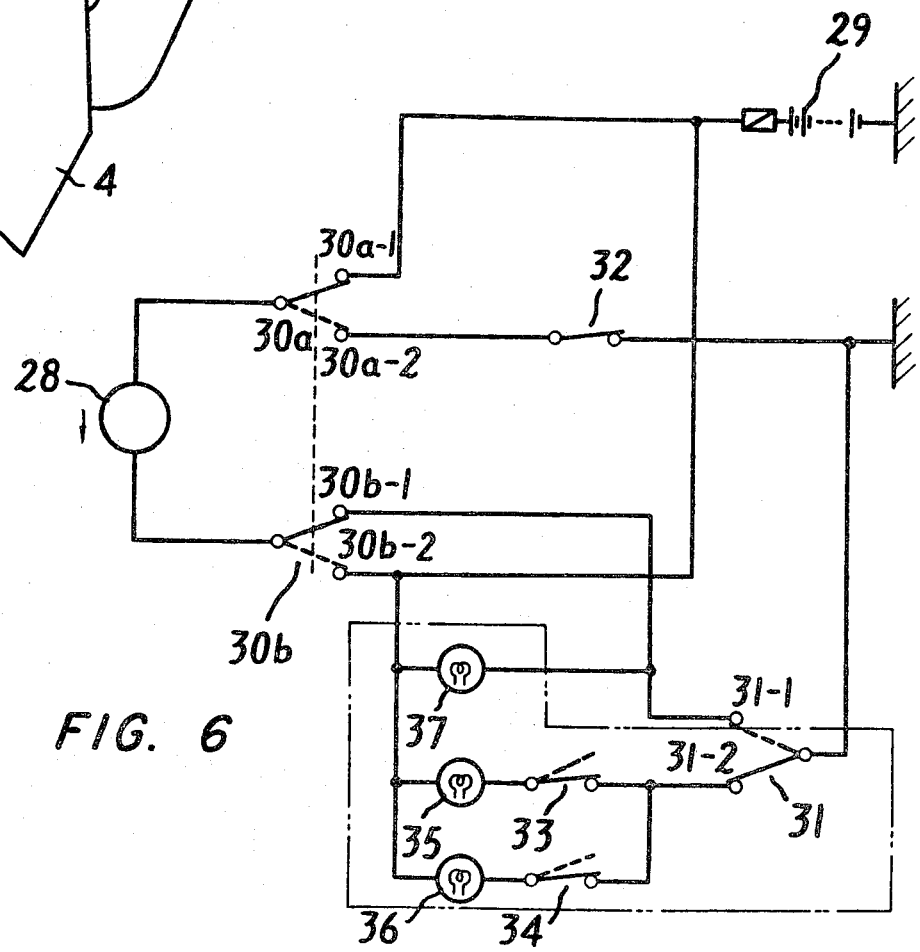
FIG. 6 is a schematic diagram of a warning system embodying the invention.

An exemplary embodiment of a warning system for use, in accordance with the present invention, in a belt system of the movable anchor type shown in FIG. 1 to 5, is illustrated in FIG. 6. The system in FIG. 6 is particularly adapted for a passive belt system which uses a reversible electric motor 28 to move the movable anchor between the restraint and release locations. The motor is powered by a vehicle battery 29 and operates in response to a double-pole, double-throw switch that responds to opening and closing of the door. When the door is closed, the motor 28 is energized by a circuit from the battery across switch contact 30a-1 to the motor and across switch contact 31-1 of a restraint position limit switch to ground. In this condition the motor drives the movable anchor from the release position to the restraint position. When the movable anchor reaches the restraint location, the single-pole, double-throw switch 32 transfers to contact 31-2, thereby opening the circuit across the motor 28 and stopping it. During the time that the motor is energized, an indicator lamp 37 warns the occupant that the belt system is not in operative condition.

The indicator switch 33 located on the fixed anchor 22 for engagement and transfer by the locking pawl 21 is open when the pawl is in the proper latching engagement with the locking notch 25b in the movable anchor. Accordingly, an indicator lamp 35 is not displayed when the pawl is properly latched. Moreover, the switch 33 and lamp 35 are in series with the contact 31-2, so the indicator lamp 35 will not be lighted in any event unless the movable anchor is at the restraint location. Accordingly, the occupant is not confornted with a warning signal indicative of malfunction of the latch pawl 21 unless the vehicle door is closed and the movable anchor is at the restraint location. If the locking pawl 21 fails to latch properly in the locking notch 25b of the movable anchor, the switch 33 is engaged and closed, and the warning lamp 35 goes on, thus indicating the malfunction of the movable anchor lock.

The indicating switch 34 installed on the buckle assembly (see FIG. 5) is connected in series with a warning lamp 36. When the buckle is unfastened, the switch 34 is closed, and the warning lamp 36 goes on, provided that the movable anchor is at the restraint location, thereby closing the switch 31 to contact 31-2. The occupant is not, however, confronted by an unnecessary warning signal indicative of a disconnected buckle unless the movable anchor is at the restraint location. When the buckle is fastened, the tongue 7 moves the slider toggle 38 into contact with the switch 34 and transfers it to open, thereby de-energizing the lamp 36. Accordingly, the warning system remains inactive as long as the movable anchor is not at the restraint location, except that the indicator lamp 37 will go on to indicate that the movable anchor is not at the restraint location. The distraction of unnecessary warning lamps is avoided. The lamps 35 and 36 will go on only when the shoulder belt is in the restraint configuration.

When the vehicle door is opened, the switch 30 transfers to reverse the connection of the motor 28, i.e., to connect the motor 28 across the battery 29 through switch contacts 30a-2 and 30b-2. The reverse energization of the motor moves the movable anchor away from the restraint location, thereby transferring the switch 31 to the contact 31-1. When the movable anchor reaches the release location, it engages and opens a limit switch 32, thereby stopping the motor. The indicator lamp 37 will go on and will stay on until the door recloses and the movable anchor returns to the restraint location.

The warning lamps may, of course, be replaced or supplemented by buzzers or other audible devices. One or more of the warning switches can also be tied in to the vehicle engine starting circuit so that the engine cannot be started unless the restraint system is in functional condition.

Figure 7:
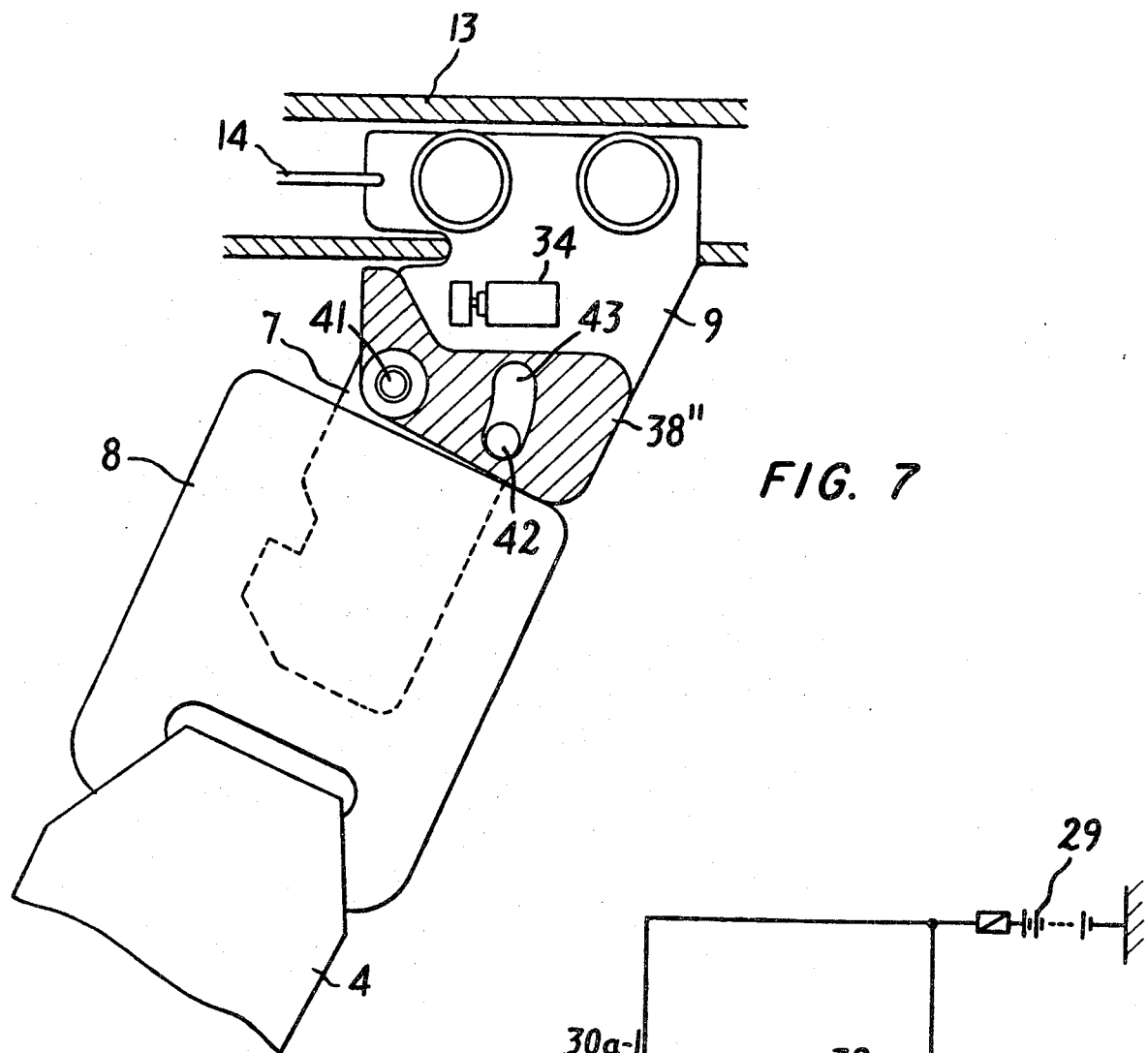
FIG. 7 is an elevational view, partially broken away in cross section, of another buckle and warning switch toggle shown in the engaged position.

The indicating switch installed on the buckle assembly is not limited to the above-described embodiment. In the embodiment shown in FIGS. 7 and 8 the toggle 38 is replaced by a toggle 38" pivotally carried on the arm 9 by means of pins 41 and 42. Pin 42 is received in a corresponding arcuate slot 43 provided in the toggle 38". As shown in FIG. 7, when the toggle 7 is latched in position in the buckle 8, the end of the tongue 7 pushes the toggle 38" upwardly and away from engagement with the detector switch 34. When the buckle 8 is detached and the tongue 7 released, as shown in FIG. 8, the toggle 38" slides down by gravity, thereby transferring the switch 34.

The embodiment shown in FIG. 9 operates in a manner similar to the embodiment of FIGS. 7 and 8. The toggle 38" is pivotally carried on the arm 9 by a pin 41'. When the tongue 7 is latched in position in the buckle 8, the end of the tongue 7 pushes the toggle 38" upwardly and away from engagement with the detector switch 34. When the buckle 8 is detached and the tongue 7 released (not shown), the toggle 38" pivots about pin 41' by gravity, thereby engaging the detector switch 34.

The above-described embodiments are merely exemplary, and numerous variations and modifications will be readily apparent to those skilled in the art without departing from the spirit and scope of the invention. All such variations and modifications are intended to be included within the scope of the invention as defined in the appended claims.

I claim:

1. A passive vehicle occupant seat belt system comprising a shoulder belt extending upwardly and outwardly across the vehicle seat from adjacent the inboard lower rear portion of the seat, a guide rail affixed to the edge of the vehicle roof generally above the door, a movable anchor received by the guide rail for movement between a restraint location adjacent the rear end of the guide rail and a release location adjacent the front end of the guide rail, means for moving the movable anchor between the release and restraint locations in response to closing and opening of the vehicle door, emergency release buckle means for releasably connecting the outboard end of the shoulder belt to the movable anchor, a fixed anchor adjacent the restraint location of the movable anchor and including a locking pawl adapted to lock the movable anchor at the restraint location, means for detecting the presence of the movable anchor at the restraint location and for producing a warning signal when the movable anchor is not at the restraint location, means for detecting when the pawl is disengaged from the movable anchor and for producing a warning signal thereof only when the movable anchor is at the restraining location, and means for detecting when the buckle is not fastened and for producing a warning signal indicative thereof only when the movable anchor is at the restraining location.

2. A seat belt system according to claim 1 wherein the means for detecting that the pawl is not locked to the movable anchor includes an electric switch that is adapted to be engaged and transferred response to movements of the pawl between its non-locking and locking positions.

3. A seat belt system according to claim 1 or claim 2 wherein the means for detecting when the buckle means is uncoupled is an electric switch that is adapted to be engaged and transferred in response to the coupling and uncoupling of the buckle means.

4. A seat belt system according to claim 2 wherein the means for detecting the presence of the movable anchor at the restraint position includes an electric limit switch adapted to be engaged and transferred in response to movement of the movable anchor into and away from the restraint location and wherein said electric switches are connected in series across a power supply.

5. A seat belt system according to claim 1 wherein the means for detecting when the buckle means is coupled is an electric switch that is adapted to be engaged and transferred in response to the coupling and uncoupling of the buckle means, wherein the means for detecting the presence of the movable anchor at the restraint position includes an electric limit switch adapted to be engaged and transferred in response to movement of the movable anchor into and away from the restraint location, and wherein said electric switches are connected in series across a power supply.

6. A seat belt system according to any of the claims 1, 2 or 5 wherein the means for determining when the buckle means is uncoupled comprises a tongue plate member, a buckle, a toggle member, and means for transferring the toggle member between a first, engaging position and a second, disengaging position responsive to the movement of said tongue plate member.

7. A seat belt system according to claim 6 wherein the means for transferring the toggle member between the engaging position and the disengaging position is the force of gravity.

* * * * *